(12) United States Patent
Long et al.

(10) Patent No.: US 12,209,405 B2
(45) Date of Patent: Jan. 28, 2025

(54) INSULATION MOUNTING BRACKET

(71) Applicant: Owens Corning Intellectual Capital, LLC, Toledo, OH (US)

(72) Inventors: Jack Long, Fort Wayne, IN (US); Angela Ogino, Urbana, IN (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 147 days.

(21) Appl. No.: 17/920,829

(22) PCT Filed: Apr. 28, 2021

(86) PCT No.: PCT/US2021/029531
§ 371 (c)(1),
(2) Date: Oct. 24, 2022

(87) PCT Pub. No.: WO2021/222337
PCT Pub. Date: Nov. 4, 2021

(65) Prior Publication Data
US 2023/0235550 A1 Jul. 27, 2023

Related U.S. Application Data

(60) Provisional application No. 63/017,261, filed on Apr. 29, 2020.

(51) Int. Cl.
*E04B 1/38* (2006.01)
*E04B 1/94* (2006.01)
*F16M 13/02* (2006.01)
*E04B 2/96* (2006.01)

(52) U.S. Cl.
CPC .............. *E04B 1/388* (2023.08); *E04B 1/942* (2013.01); *E04B 1/947* (2013.01); *F16M 13/02* (2013.01); *E04B 2/96* (2013.01)

(58) Field of Classification Search
None
See application file for complete search history.

(56) References Cited

U.S. PATENT DOCUMENTS

| 529,331 | A | * | 11/1894 | Lane | ..................... E04B 1/2612 217/65 |
| 2,007,374 | A | * | 7/1935 | Kuehne | ..................... E04B 1/82 52/145 |
| 4,449,341 | A | | 5/1984 | Taglianetti et al. | |
| 4,471,592 | A | | 9/1984 | MacKinnon et al. | |

(Continued)

FOREIGN PATENT DOCUMENTS

| WO | 2005090697 A1 | 9/2005 |
| WO | 2021222335 A1 | 11/2021 |

OTHER PUBLICATIONS

International Search Report and Written Opinion from PCT/US21/29531 dated Aug. 3, 2021.

(Continued)

*Primary Examiner* — Joshua K Ihezie
(74) *Attorney, Agent, or Firm* — Calfee, Halter & Griswold LLP

(57) ABSTRACT

A one-piece insulation mounting bracket is disclosed. The mounting bracket readily supports the insulation (e.g., curtain wall insulation) without the need for separate fasteners, locking washers, etc. As a result, the insulation can be mounted more quickly than with conventional mounting systems.

19 Claims, 14 Drawing Sheets

(56) References Cited

U.S. PATENT DOCUMENTS

| | | | |
|---|---|---|---|
| 4,512,130 A * | 4/1985 | Pepin | E04D 13/1625 52/404.2 |
| 4,576,532 A | 3/1986 | Hanson et al. | |
| 4,653,241 A * | 3/1987 | Bindi | E04B 1/7629 52/746.1 |
| 4,918,879 A * | 4/1990 | Bodurow | E04B 1/6183 52/277 |
| 4,918,893 A | 4/1990 | Vandenbroucke et al. | |
| 5,058,352 A | 10/1991 | Loiselle et al. | |
| 5,060,441 A * | 10/1991 | Pichette | E04B 1/7666 52/855 |
| 5,299,403 A | 4/1994 | Fentz | |
| 5,502,937 A | 4/1996 | Wilson | |
| 5,715,637 A * | 2/1998 | Hesterman | E04C 2/296 52/387 |
| 5,765,332 A | 6/1998 | Landin et al. | |
| 5,845,440 A | 12/1998 | Matsuyama et al. | |
| 5,875,604 A * | 3/1999 | Rudd | E04C 3/292 52/846 |
| 6,430,885 B1 * | 8/2002 | Ito | E04F 13/0816 52/282.1 |
| 6,457,292 B1 * | 10/2002 | Vrana | E04C 3/292 411/467 |
| 6,612,090 B1 * | 9/2003 | Corden | E04F 13/12 52/762 |
| 7,278,244 B1 * | 10/2007 | Rubio | E04C 3/07 52/351 |
| 7,424,793 B1 | 9/2008 | Shriver | |
| 7,739,844 B2 * | 6/2010 | Gharibeh | E04B 5/40 52/801.1 |
| 7,765,753 B1 | 8/2010 | Shriver | |
| 7,886,491 B1 | 2/2011 | Shriver | |
| 8,683,763 B2 | 4/2014 | Shriver | |
| 9,016,014 B2 | 4/2015 | Shriver | |
| 9,790,683 B1 | 10/2017 | Harkins | |
| 10,202,759 B2 | 2/2019 | Andresen et al. | |
| 10,309,100 B2 | 6/2019 | Long et al. | |
| 10,329,761 B2 | 6/2019 | Stahl, Jr. et al. | |
| 10,329,762 B2 * | 6/2019 | Stahl, Jr. | E04B 2/96 |
| 10,370,846 B1 | 8/2019 | Neuwirt | |
| 10,538,915 B1 | 1/2020 | Zemler et al. | |
| 2004/0216416 A1 | 11/2004 | Hohmann et al. | |
| 2018/0010331 A1 | 1/2018 | Romes | |
| 2018/0142463 A1 | 5/2018 | Siddhartha et al. | |
| 2018/0142469 A1 * | 5/2018 | Stahl, Jr. | E04B 2/88 |
| 2018/0163397 A1 | 6/2018 | Long et al. | |
| 2019/0153727 A1 | 5/2019 | Stahl, Jr. et al. | |
| 2023/0160201 A1 * | 5/2023 | Long | E04B 2/96 52/235 |

OTHER PUBLICATIONS

International Search Report and Written Opinion from PCT/US21/29527 dated Aug. 3, 2021.

1 Extended European Search Report from EP Application No. 21796109.3 dated Apr. 22, 2024.

1 Office Action from U.S. Appl. No. 17/920,828 dated Apr. 10, 2024.

Office Action from U.S. Appl. No. 17/920,828 dated Aug. 8, 2024.

Office Action from U.S. Appl. No. 17/920,828 dated Oct. 31, 2024.

* cited by examiner

DETAIL A

INSULATION MOUNTING BRACKET

CROSS-REFERENCE TO RELATED APPLICATION(S)

This application is the U.S. national stage entry of International Application No. PCT/US2021/029531, filed Apr. 28, 2021, which claims priority to and the benefit of U.S. Provisional Patent Application No. 63/017,261, filed Apr. 29, 2020, the entire disclosures of which are incorporated herein by reference in full.

FIELD

The general inventive concepts relate to insulation systems and, more specifically, to a mounting bracket for use in insulation systems.

BACKGROUND

High rise buildings are typically constructed with concrete slab floors that "float" within an outer skin (i.e., windows and cladding materials interfaced with an aluminum framework). In other words, the outer skin does not carry the load of the floors. The intersection of the exterior (curtain) walls and these floor slabs provide a gap through which a fire on one floor may spread/climb vertically to floors above. Consequently, it is well known to insulate these gaps with fire-resistant materials to retard the spread of a fire from one floor to the next. This insulation takes the form of curtain wall insulation, safing insulation, and the like that fit in and around the framework (e.g., mullions and transoms). For example, U.S. Pat. No. 10,309,100, the entirety of which is incorporated herein by reference, describes a conventional curtain wall insulation system.

A conventional curtain wall insulation system 100 is shown in FIG. 1. The curtain wall insulation system 100 is useful for insulating a curtain wall structure 150 connected to a building structure (not shown). As one of skill in the art will appreciate, a curtain wall structure 150 is a type of exterior wall system commonly used on buildings, such as high-rise buildings, wherein the curtain wall structure 150 does not bear the load of the building structure. As see in FIG. 1, the curtain wall structure 150 is spaced from a floor slab 160 of the building structure to define a perimeter void 170. The curtain wall structure 150 includes framing defined by at least first and second vertically disposed and parallel mullions 152, at least one upper horizontally disposed transom 154, and at least one lower horizontally disposed transom 156. The curtain wall insulation system 100 provides thermal insulation and also provides a barrier to inhibit the spread of fire from one floor of a building to an upper adjacent floor through the perimeter void 170.

With continued reference to FIG. 1, the curtain wall insulation system 100 includes a curtain wall insulation 102. The curtain wall insulation 102 may be formed of various materials based on a desired failure temperature of the material such as mineral wool, which can maintain its integrity for more than five hours at temperatures of nearly 2,100° F. Such curtain wall insulation 102 is commercially available from Thermafiber, Inc. of Wabash, Ind. The curtain wall insulation 102 may have a thickness of 1 inch to 8 inches, and a density of 4 pounds per cubic foot to 8 pounds per cubic foot. The curtain wall insulation 102 is disposed within the framing and mechanically attached to the framing. Accordingly, the size and shape of the curtain wall insulation 102 will typically depend on the size and shape of the framing into which the curtain wall insulation 102 is being installed. The curtain wall insulation 102 may be mechanically attached to the framing with insulation hangers (not shown), such as Impasse® insulation hangers available from Thermafiber, Inc. of Wabash, Ind., or by other conventional means used to mechanically attach curtain wall insulation 102 to the framing, such as impaling pins or screws.

As shown in FIG. 1, the curtain wall insulation system 100 also includes a safing insulation 104 having a bottom surface 105 and a top surface 106. The safing insulation 104 is disposed within the perimeter void 170 and compression fit between the curtain wall insulation 102 and the floor slab 160. The safing insulation 104 inhibits flames and hot gases from moving from a first floor to an adjacent upper floor through the perimeter void 170. As with the curtain wall insulation 102, the safing insulation 104 may be formed of various materials based on a desired failure temperature of the material. In certain embodiments, the safing insulation 104 comprises mineral wool. The safing insulation 104 may have a thickness of 1 inch to 8 inches, and a density of 4 pounds per cubic foot to 8 pounds per cubic foot. Such safing insulation 104 is commercially available from Thermafiber, Inc. of Wabash, Ind. When installed, the safing insulation 104 is commonly compressed to varying degrees, but normally it is compressed to approximately 25%. After installation, the safing insulation 104 provides fireproof sealing of the perimeter void 170. Because the safing insulation 104 is compressed when installed, it provides some capability to expand which can seal openings or cracks that might otherwise develop in the perimeter void 170. Slight variations in the size of the perimeter void 170 due to expansion or other environmental changes are accommodated by the safing insulation 104 since it is compressed when placed in the perimeter void 170, and thus can provide an effective seal under various conditions.

In certain embodiments, the curtain wall insulation system 100 includes a reinforcement member 130 attached to and disposed between the mullions 152 and behind the curtain wall insulation 102. The reinforcement member 130 is positioned at a level corresponding to a level of the safing insulation 104, which level is commonly referred to as the safing line. The reinforcement member 130 prevents bowing or deformation of the curtain wall insulation 102 due to the compression fit of the safing insulation 104. The reinforcement member 130 may have various shapes or configurations. For example, the reinforcement member may have a T-shape, as shown in FIG. 1, an L-shape, or may be formed as a channel (e.g., C-shaped channel, U-shaped channel). Brackets (not shown) may be used to attach the reinforcement member 130 to the mullions 152. The reinforcement member 130 may be formed of various materials including, but not limited to, steel, galvanized steel, ceramics, and other heat-resistant materials.

As shown in FIG. 1, the curtain wall insulation system 100 includes a mullion cover hanger 110 that is attached to the mullions 152 and a mullion cover 120 that is attached to the mullion cover hanger 110. The mullion cover 120 protects the mullions 152 from hot flames and gases during a fire. The mullion cover 120 may be formed of various materials based on a desired failure temperature of the material. In certain embodiments, the mullion cover 120 comprises mineral wool. The mullion cover 120 may have a thickness of 1 inch to 8 inches, and a density of 4 pounds per cubic foot to 8 pounds per cubic foot. Such mullion covers 120 are commercially available from Thermafiber, Inc. of Wabash, Ind.

In certain embodiments, and as shown in FIG. 1, the curtain insulation system 100 includes a lower mullion cover 121 attached to the mullion cover hanger 110, and an upper mullion cover 123 attached to the mullion cover hanger 110. The lower mullion cover 121 is installed so that a top surface 122 of the lower mullion cover 121 will abut a bottom surface 105 of the installed safing insulation 104. Similarly, the upper mullion cover 123 is installed so that a bottom surface 124 of the upper mullion cover 123 will abut a top surface 106 of the installed safing insulation 104. This configuration provides an effective seal of insulation that inhibits hot flames and gases from reaching the mullions 152.

As discussed above, the mullion cover hanger 110 can be attached to a mullion 152 (with fasteners, such as screws, or by welding) at a point above a floor slab 160 and at a point below the floor slab 160, where an installer has relatively open access for using electric tools, such as a power drill, electric screwdriver, or welder. After the mullion cover hanger 110 is installed on the mullion 152, an installer can easily attach the mullion cover 120 to the mullion cover hanger 110 without using electric tools, such as a power drill or electric screwdriver, or additional fasteners.

During a fire, there is a lot of turbulence, movement, and gravitational pull, all of which can cause the insulation to become dislodged, thereby allowing the fire to propagate to the next floor. Accordingly, mechanical fasteners are typically used to secure the insulation (e.g., the curtain wall insulation 102) to the building structure (e.g., the mullions 152 and the transoms 154, 156).

A conventional approach to mounting curtain wall insulation relies on mounting brackets. As shown in FIGS. 2A, 2B, and 2C, a conventional mounting system 200 includes a vertical hanger 210, a horizontal hanger 230, and a locking washer 250.

The vertical hanger 210 includes a body 212, a first leg 214, a second leg 216, and a flange 218. The first leg 214 extends from and perpendicular to the body 212. The second leg 216 extends from and perpendicular to the body 212. The flange 218 extends from and perpendicular to an end of the first leg 214. The flange 218 includes an aperture therethrough that forms a mounting hole 220. The mounting hole 220 is used to mount the vertical hanger 210 to a mullion via a fastener (e.g., screw). An end of the second leg 216 includes a pair of prongs 222, which are separated from one another by a gap. Each of the prongs 222 tapers into a pointed end.

The horizontal hanger 230 includes a body 232, a first leg 234, a second leg 236, and a flange 238. The first leg 234 extends from and perpendicular to the body 232. The second leg 236 extends from and perpendicular to the body 232. The flange 238 extends from and perpendicular to an end of the first leg 234. The flange 238 includes an aperture therethrough that forms a mounting hole 240. The mounting hole 240 is used to mount the vertical hanger 230 to a transom via a fastener (e.g., screw). An end of the second leg 236 includes a pair of prongs 242, which are separated from one another by a gap. Each of the prongs 242 tapers into a pointed end.

The locking washer 250 includes a body 252 with an aperture therethrough that forms a slot 254. The slot 254 has a thickness and width sufficient for the prongs 222 of the vertical hanger 210 and the prongs 242 of the horizontal hanger 230 to pass therethrough.

The conventional mounting system 200 functions as follows. Multiple vertical hangers 210 and multiple horizontal hangers 230 are interfaced with a portion of curtain wall insulation sized to fit within a curtain wall region (i.e., at least a portion of a region framed by a pair of parallel mullions and a pair of parallel transoms). More specifically, each vertical hanger 210 is pressed through the insulation so that a rear face of the insulation abuts the body 212 of the hanger 210, a side of the insulation abuts the first leg 214 of the hanger 210, and the prongs 222 extend through the insulation and beyond a front face of the insulation. Likewise, each horizontal hanger 230 is pressed through the insulation so that a rear face of the insulation abuts the body 232 of the hanger 230, a side of the insulation abuts the first leg 234 of the hanger 230, and the prongs 242 extend through the insulation and beyond a front face of the insulation. The second leg 216 of each vertical hanger 210 and the second leg 236 of each horizontal hanger 230 functions as a shelf-like ledge that supports the weight of the insulation.

For each pair of prongs 222, 242 extending through the insulation, a locking washer 250 is manually pressed onto the prongs so that the prongs pass through the slot 254 of the locking washer 250, as shown in FIG. 3A. Then, the prongs are manually bent in opposite directions, as shown in FIG. 3B, to effectively lock the insulation on the respective hangers 210, 230. In this manner, the curtain wall insulation is interfaced with the hangers 210, 230.

Thereafter, the curtain wall insulation can be positioned and mounted in the curtain wall region. More specifically, a fastener (now shown), such as a screw, passes through the mounting hole 220 of each vertical hanger 210 to secure the hanger 210 to a mullion. Likewise, a fastener (now shown), such as a screw, passes through the mounting hole 240 of each horizontal hanger 230 to secure the hanger 230 to a transom. In this manner, the curtain wall insulation (e.g., curtain wall insulation 102) is mechanically secured within the curtain wall region, as shown in the insulation installation 400 of FIG. 4A. Typically, a piece of insulation (i.e., the mullion cover 123) is then positioned over the mullion 152 to protect it in the event of a fire, as shown in the insulation installation 400 of FIG. 4B. The mullion cover 123 can be secured to the curtain wall insulation 102 via fasteners, such as spiral screws 402 or other separate mounting hangers/brackets.

While effective in mounting insulation within a curtain wall, the conventional insulation mounting system 200 requires transport and manual installation of many pieces (e.g., x brackets and x locking washers for a total of 2x pieces), which results in a relatively lengthy installation time. Accordingly, there is an unmet need for an improved insulation mounting system that requires transports and manual installation of significantly fewer pieces (e.g., ≤x total pieces) and, thus, can result in a significantly reduced installation time.

SUMMARY

The general inventive concepts relate to an insulation mounting system, including an innovative mounting bracket for use therein. The mounting bracket can support the insulation without the use of locking washers. Furthermore, the mounting bracket can interface with support structure (e.g., mullion, transom) without the use of separate fasteners. Accordingly, insulation can be mounted more quickly using the insulation mounting system, as opposed to conventional insulation mounting systems.

In one exemplary embodiment, a mounting bracket is disclosed that comprises a bracket body having a middle portion, a first sidewall, a first leg, a first shaped portion, a second sidewall, a second leg, and a second shaped portion, wherein the middle portion extends between and connects the first sidewall and the second sidewall; wherein the first leg extends from the first sidewall; wherein the first shaped portion extends from the first leg; wherein the second leg extends from the second sidewall; and wherein the second shaped portion extends from the second leg.

In some exemplary embodiments, a height of the middle portion is equal to a height of the first sidewall and a height of the second sidewall.

In some exemplary embodiments, a depth of the middle portion is equal to a width of the first sidewall and a width of the second sidewall.

In some exemplary embodiments, the middle portion forms an angle θ with each of the first sidewall and the second sidewall; and the angle θ is less than 90 degrees. In some exemplary embodiments, the angle θ is greater than 70 degrees. In some exemplary embodiments, the angle θ is 85 degrees.

In some exemplary embodiments, the first leg is perpendicular to the first sidewall.

In some exemplary embodiments, a height of the first leg is equal to a height of the first sidewall.

In some exemplary embodiments, a depth of the first leg is equal to a width of the first sidewall.

In some exemplary embodiments, the second leg is perpendicular to the second sidewall.

In some exemplary embodiments, a height of the second leg is equal to a height of the second sidewall.

In some exemplary embodiments, a depth of the second leg is equal to a width of the second sidewall.

In some exemplary embodiments, the first shaped portion includes a body having one or more barbs and a tapered end. In some exemplary embodiments, the body includes a plurality of the barbs. In some exemplary embodiments, the body includes four of the barbs. In some exemplary embodiments, a number of the barbs on one side of the body differs from a number of the barbs on the opposite side of the body.

In some exemplary embodiments, the first shaped portion is symmetrical about a central axis of the body.

In some exemplary embodiments, the central axis of the body is perpendicular to the first leg.

In some exemplary embodiments, the first shaped portion extends from an end of the first leg furthest from the first sidewall.

In some exemplary embodiments, a height of the first shaped portion is less than a height of the first leg.

In some exemplary embodiments, a width of the first shaped portion is less than a width of the first leg.

In some exemplary embodiments, a depth of the first shaped portion is greater than a depth of the first leg.

In some exemplary embodiments, a depth of the first shaped portion is less than a depth of the first sidewall.

In some exemplary embodiments, a depth of the first shaped portion is greater than a depth of the first sidewall.

In some exemplary embodiments, the second shaped portion includes a body having one or more barbs and a tapered end. In some exemplary embodiments, the body includes a plurality of the barbs. In some exemplary embodiments, the body includes four of the barbs. In some exemplary embodiments, a number of the barbs on one side of the body differs from a number of the barbs on the opposite side of the body.

In some exemplary embodiments, the second shaped portion is symmetrical about a central axis of the body.

In some exemplary embodiments, the central axis of the body is perpendicular to the second leg.

In some exemplary embodiments, the second shaped portion extends from an end of the second leg furthest from the second sidewall.

In some exemplary embodiments, a height of the second shaped portion is less than a height of the second leg.

In some exemplary embodiments, a width of the second shaped portion is less than a width of the second leg.

In some exemplary embodiments, a depth of the second shaped portion is greater than a depth of the second leg.

In some exemplary embodiments, a depth of the second shaped portion is less than a depth of the second sidewall.

In some exemplary embodiments, a depth of the second shaped portion is greater than a depth of the second sidewall.

In some exemplary embodiments, the bracket body is a unitary structure.

In some exemplary embodiments, the bracket body is made of a metal or a metal alloy.

In some exemplary embodiments, the bracket body is made of a ceramic material.

In some exemplary embodiments, the bracket body includes a mounting cavity defined by the middle portion, the first sidewall, and the second sidewall; wherein the mounting cavity is sized to be friction fit onto a mounting structure. In some exemplary embodiments, the mounting structure is a mullion.

In some exemplary embodiments, the bracket body further includes a mullion cover mount having a pair of spaced barbs.

In one exemplary embodiment, a curtain wall insulation installation system is disclosed that comprises a plurality of mounting brackets, each of the mounting brackets comprising a bracket body having a middle portion, a first sidewall, a first leg, a first shaped portion, a second sidewall, a second leg, and a second shaped portion, wherein the middle portion extends between and connects the first sidewall and the second sidewall; wherein the first leg extends from the first sidewall; wherein the first shaped portion extends from the first leg; wherein the second leg extends from the second sidewall; and wherein the second shaped portion extends from the second leg. Each of the mounting brackets may also have any of the other features shown, described, or otherwise suggested herein.

Other aspects and features of the general inventive concepts will become more readily apparent to those of ordinary skill in the art upon review of the following description of various exemplary embodiments in conjunction with the accompanying figures.

BRIEF DESCRIPTION OF THE DRAWINGS

The general inventive concepts, as well as embodiments and advantages thereof, are described below in greater detail, by way of example, with reference to the drawings in which:

FIG. 2A shows various views of a vertical hanger. FIG. 2B shows various views of a horizontal hanger. FIG. 2C shows a locking washer for interfacing with the vertical hanger of FIG. 2A and the horizontal hanger of FIG. 2B.

FIG. 5A is a perspective view of the mounting bracket. FIG. 5B is a plan view of the mounting bracket. FIG. 5C is a detailed view of a portion of the mounting bracket indicated in FIG. 5B. FIG. 5D is a front elevational view of the mounting bracket. FIG. 5E is a side elevational view of the mounting bracket.

DETAILED DESCRIPTION

Figure 1:
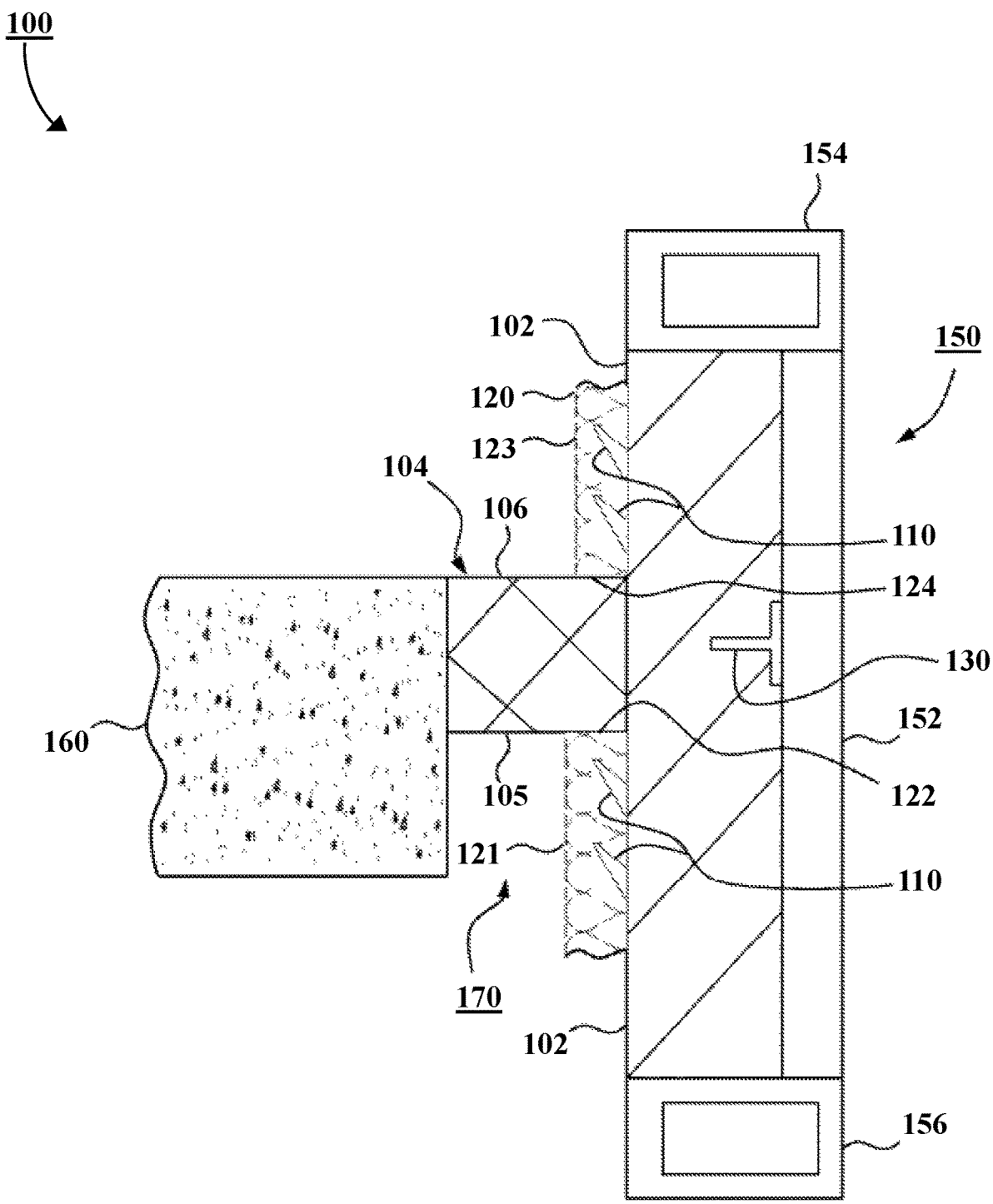
FIG. 1 is a side sectional diagram of a representational portion of a conventional curtain wall insulation system.
Figure 2A:
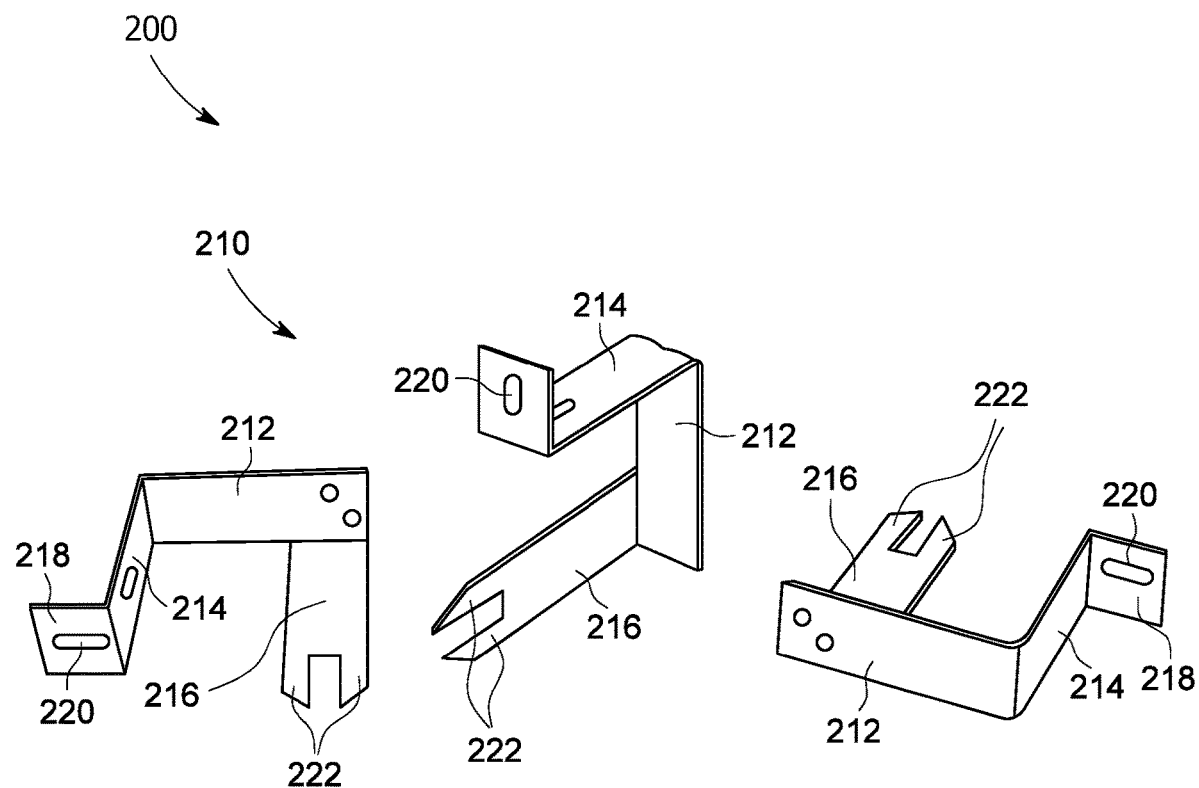
FIGS. 2A, 2B, and 2C illustrate various components of a conventional insulation mounting system.
Figure 2B:
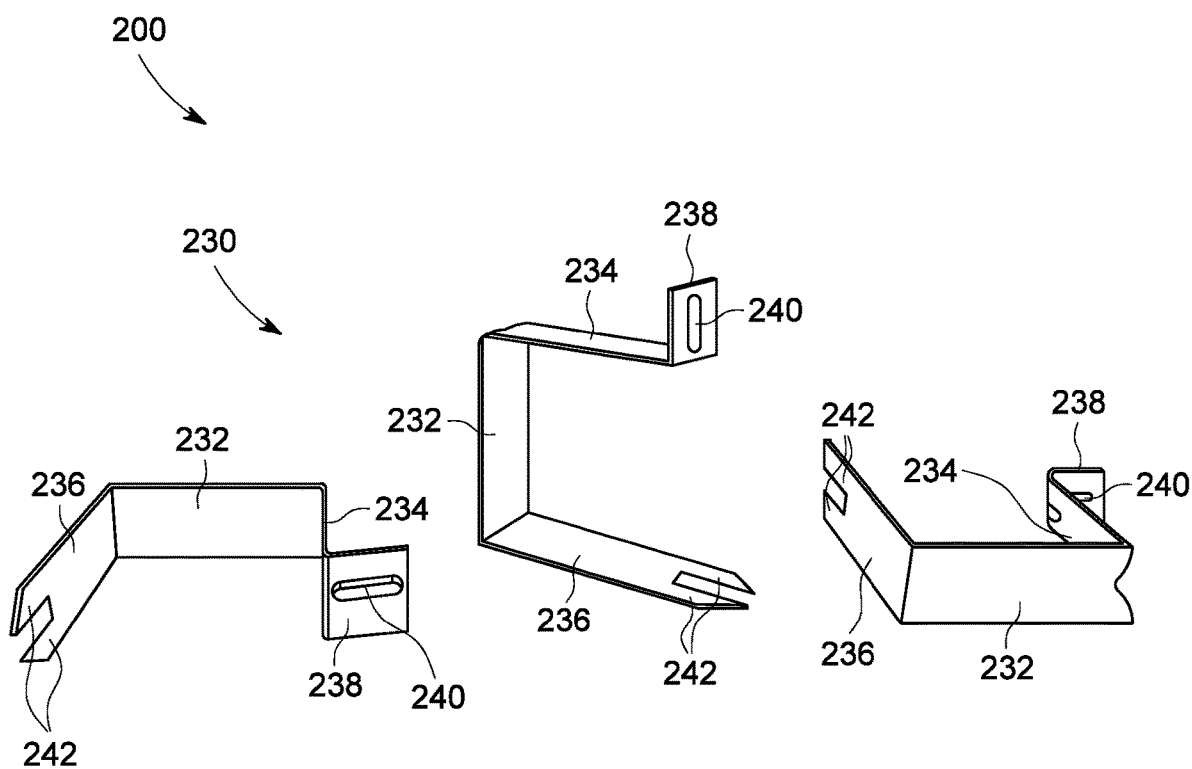
Figure 2C:
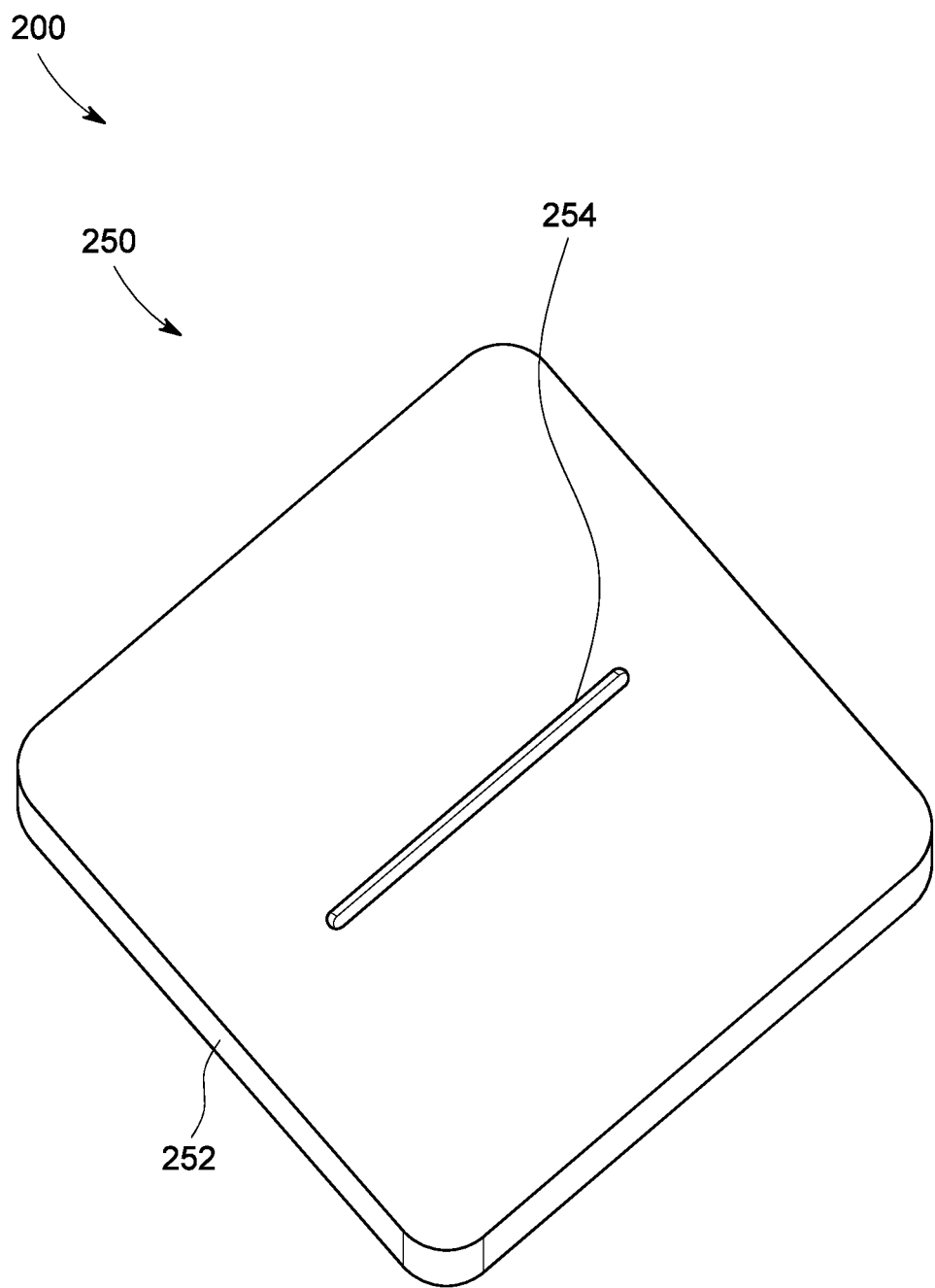
Figure 3A:
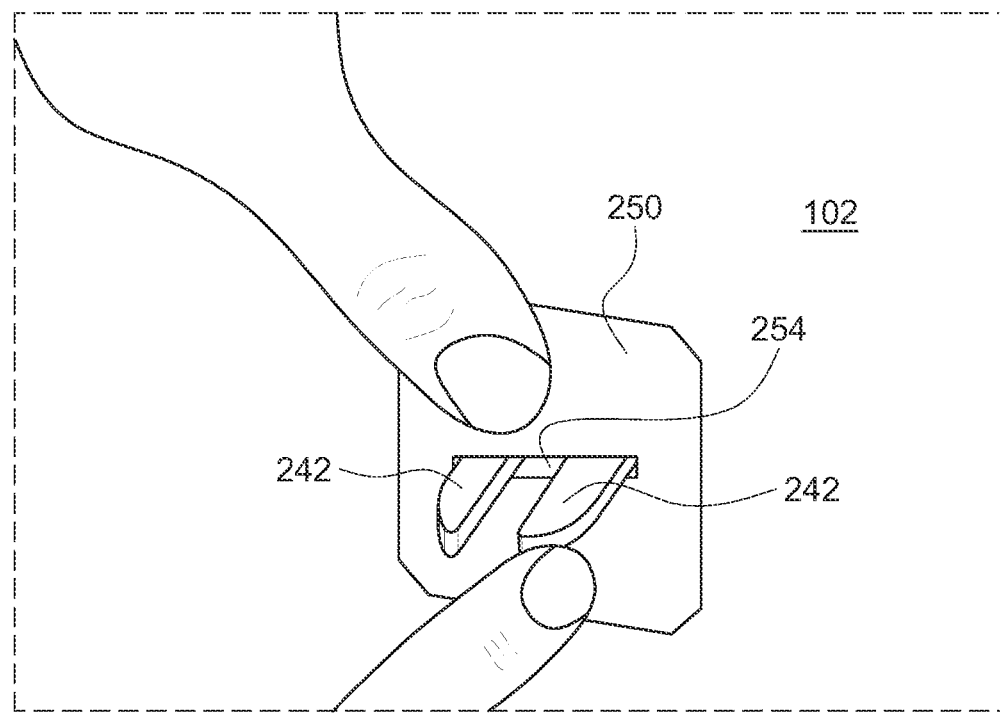
FIGS. 3A and 3B illustrate the locking washer of FIG. 2C interfacing with the horizontal hanger of FIG. 2B.
Figure 3B:
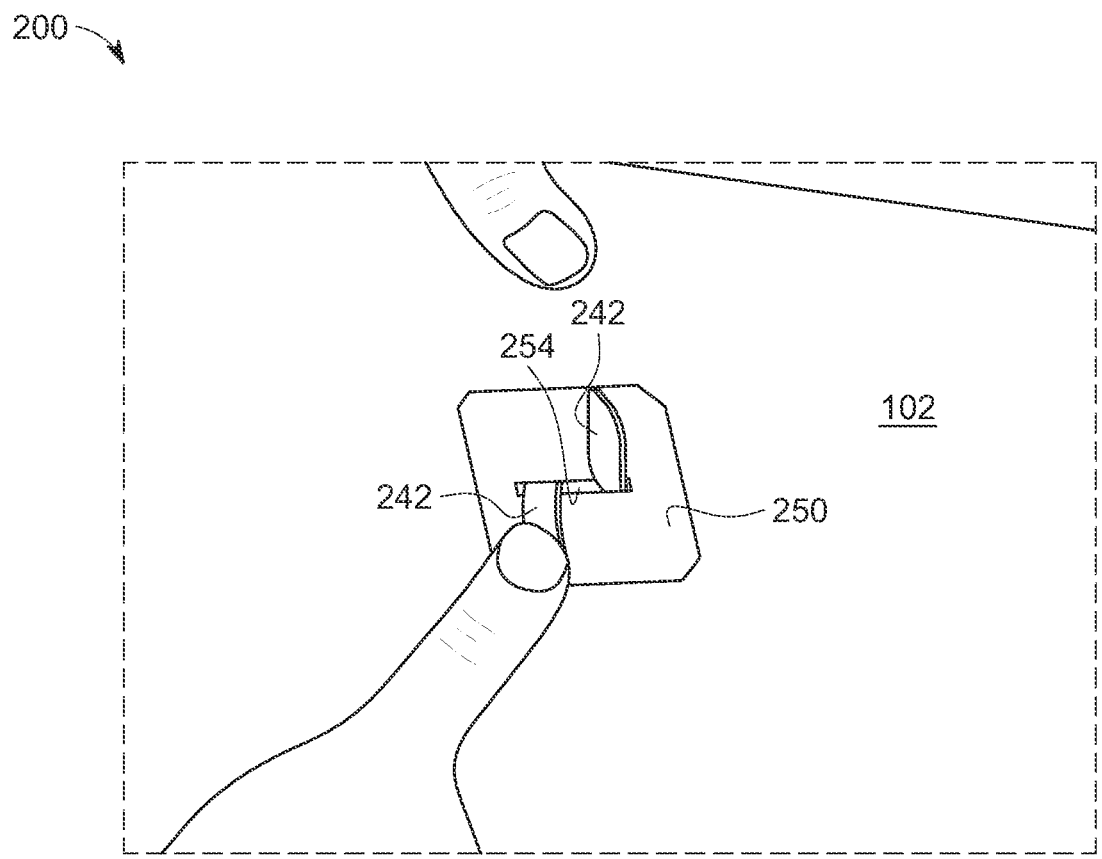
Figure 4A:
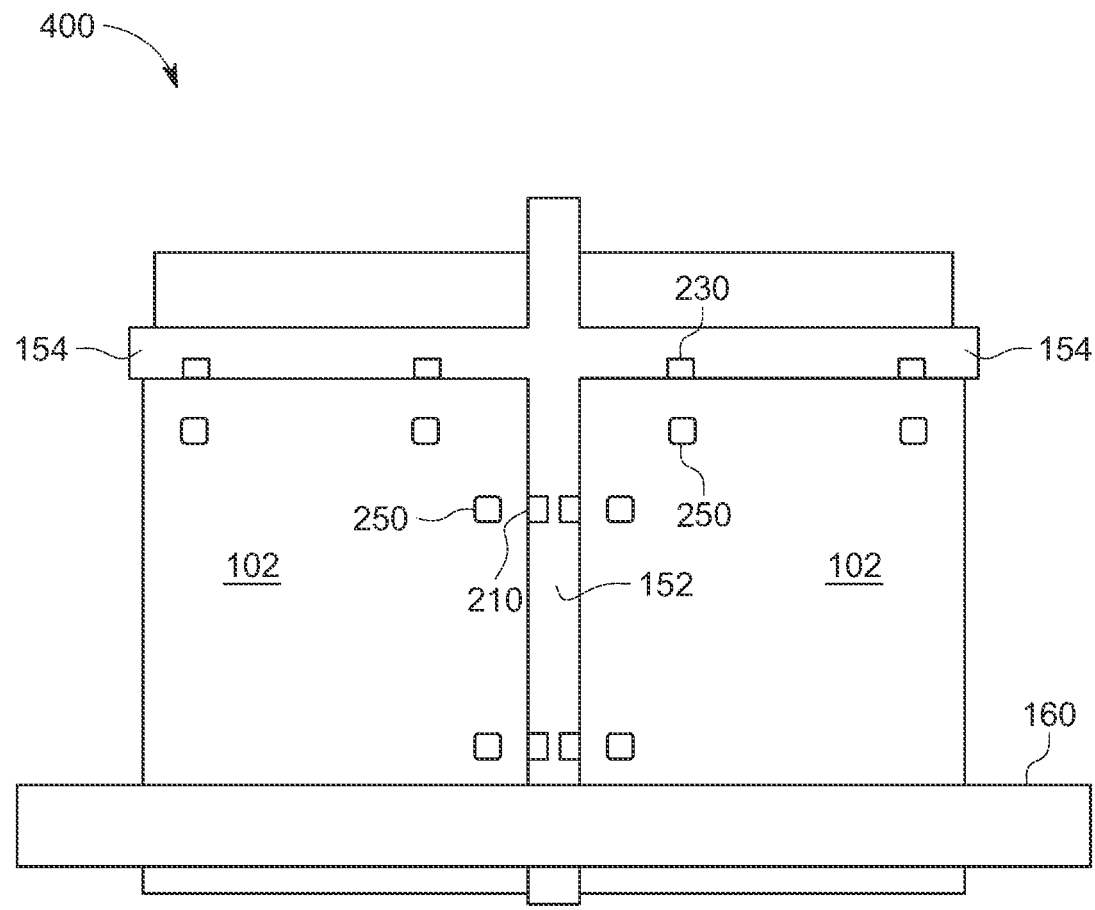
FIGS. 4A and 4B illustrate the conventional insulation mounting system of FIGS. 2A-2C being used to mount curtain wall insulation.
Figure 4B:
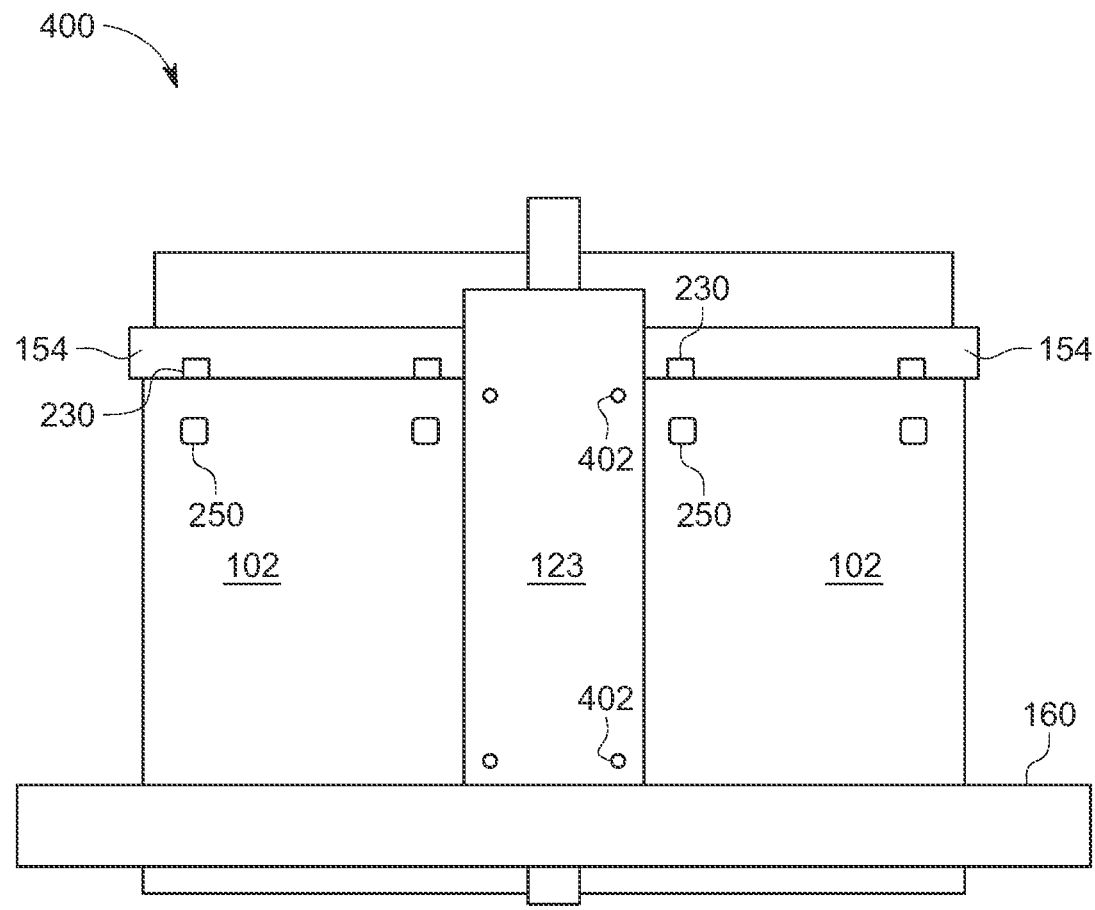

Several illustrative embodiments will be described in detail with the understanding that the present disclosure merely exemplifies the general inventive concepts. Embodiments encompassing the general inventive concepts may take various forms and the general inventive concepts are not intended to be limited to the specific embodiments described herein.

The general inventive concepts relate to an insulation mounting system, including innovative mounting brackets for use therein. The mounting brackets are one-part structures that replace conventional multi-part structures for mounting insulation, such as in a curtain wall space. For example, these unitary mounting brackets can support the insulation without the use of locking washers. Furthermore, in some exemplary embodiments, the unitary mounting brackets can interface with a support structure (e.g., mullion, transom) without the use of separate fasteners. Further still, in some exemplary embodiments, the unitary mounting brackets include means for supporting a mullion cover. Accordingly, insulation can be mounted more quickly using the insulation mounting system of the present invention, as opposed to conventional insulation mounting systems.

A single-piece mounting bracket 500, according to one exemplary embodiment, is shown in FIGS. 5A-5E. Although specific dimensions are illustrated in some of the drawings, the general inventive concepts are not limited to the disclosed dimensions.

The mounting bracket 500 includes a bracket body 502 that includes a middle portion 510, a first sidewall 520, a first leg 530, a second sidewall 540, and a second leg 550. The bracket 500 can be made of any suitable (i.e., heat-resistant) material. In some exemplary embodiments, the bracket 500 is made of a metal including, but not limited to, steel, galvanized steel, brass, and aluminum. Ceramic materials may also be used to form the bracket 500. In certain embodiments, the bracket 500 is formed of galvanized steel, and preferably 20 gauge galvanized steel.

The middle portion 510 extends between and connects the first sidewall 520 and the second sidewall 540 to one another. In some exemplary embodiments, a height $mp_h$ of the middle portion 510 is equal to a height $fs_h$ of the first sidewall 520 and a height $ss_h$ of the second sidewall 540. In some exemplary embodiments, a depth $mp_d$ of the middle portion 510 is equal to a width $fs_w$ of the first sidewall 520 and a width $ss_w$ of the second sidewall 540. The middle portion 510 forms an angle θ with each of the first sidewall 520 and the second sidewall 540, wherein θ is less than 90 degrees. In some exemplary embodiments, θ is greater than 70 degrees and less than 90 degrees. In some exemplary embodiments, θ is approximately 85 degrees (see FIG. 5B). Due to this angle θ, the first sidewall 520 and the second sidewall 540 are not parallel to one another when the bracket 500 is in an uninstalled state.

The first leg 530 extends from the first sidewall 520. In some exemplary embodiments, the first leg 530 is perpendicular to the first sidewall 520. In some exemplary embodiments, a height $fl_h$ of the first leg 530 is equal to the height $fs_h$ of the first sidewall 520. In some exemplary embodiments, a depth $fl_d$ of the first leg 530 is equal to the width $fs_w$ of the first sidewall 520. The second leg 550 extends from the second sidewall 540. In some exemplary embodiments, the second leg 550 is perpendicular to the second sidewall 540. In some exemplary embodiments, a height $sl_h$ of the second leg 550 is equal to the height $ss_h$ of the second sidewall 540. In some exemplary embodiments, a depth $sl_d$ of the second leg 550 is equal to the width $ss_w$ of the second sidewall 540.

The bracket body 502 further includes a first shaped portion 560 and a second shaped portion 570. The first shaped portion 560 extends from the first leg 530. In some exemplary embodiments, the first shaped portion 560 extends from an end of the first leg 530 furthest from the first sidewall 520. In some exemplary embodiments, (a central axis $ca_1$ of) the first shaped portion 560 is perpendicular to the first leg 530. The second shaped portion 570 extends from the second leg 550. In some exemplary embodiments, the second shaped portion 570 extends from an end of the second leg 550 furthest from the second sidewall 540. In some exemplary embodiments, (a central axis $ca_2$ of) the second shaped portion 570 is perpendicular to the second leg 550.

In some exemplary embodiments, a height $fsp_h$ of the first shaped portion 560 is less than the height $fl_h$ of the first leg 530. In some exemplary embodiments, a width $fsp_w$ of the first shaped portion 560 is less than a width $fl_w$ of the first leg 530. In some exemplary embodiments, a depth $fsp_d$ of the first shaped portion 560 is greater than the depth $fl_d$ of the first leg 530. In some exemplary embodiments, the depth $fsp_d$ of the first shaped portion 560 is less than a depth $fs_d$ of the first sidewall 520. In some exemplary embodiments, the depth $fsp_d$ of the first shaped portion 560 is equal to the depth $fs_d$ of the first sidewall 520. In some exemplary embodiments, the depth $fsp_d$ of the first shaped portion 560 is greater than the depth $fs_d$ of the first sidewall 520 (see FIG. 5E). In some exemplary embodiments, a height $ssp_h$ of the second shaped portion 570 is less than the height $sl_h$ of the second leg 550. In some exemplary embodiments, a width $ssp_w$ of the second shaped portion 570 is less than a width $sl_w$ of the second leg 550. In some exemplary embodiments, a depth $ssp_d$ of the second shaped portion 570 is greater than the depth $sl_d$ of the second leg 530. In some exemplary embodiments, the depth $ssp_d$ of the second shaped portion 570 is less than a depth $ss_d$ of the second sidewall 540. In some exemplary embodiments, the depth $ssp_d$ of the second shaped portion 570 is equal to the depth $ss_d$ of the second sidewall 540. In some exemplary embodiments, the depth $ssp_d$ of the second shaped portion 570 is greater than the depth $ss_d$ of the second sidewall 540.

The first shaped portion 560 includes a body 562 having one or more barbs 564. The body 562 includes a tapered end 566 beyond the barbs 564. The tapered end 566 facilitates passage of the first shaped portion 560 through the insulation, while the barbs 564 are operable to hold/secure the insulation on the first shaped portion 560. The body 562 of the first shaped portion 560 acts as a shelf-like ledge operable to support the weight of the insulation. While the illustrated embodiment shows the same number of barbs 564 on each side of the body 562, the general inventive concepts are not so limited. In some exemplary embodiments, one or more barbs 564 are only on one side of the body 562. In some exemplary embodiments, the number of barbs 564 on one side of the body 562 differs from the number of barbs 564 on the other side of the body 562. While the illustrated embodiment shows the first shaped portion 560 to be symmetrical about the central axis $ca_1$, the general inventive concepts are not so limited. In some exemplary embodiments, the size, shape, and/or positions of the barbs 564 differ on opposite sides of the central axis $ca_1$ of the body 562.

The second shaped portion 570 includes a body 572 having one or more barbs 574. The body 572 includes a tapered end 576 beyond the barbs 574. The tapered end 576 facilitates passage of the second shaped portion 570 through the insulation, while the barbs 574 are operable to hold/secure the insulation on the second shaped portion 570. The body 572 of the second shaped portion 570 acts as a shelf-like ledge operable to support the weight of the insulation. While the illustrated embodiment shows the same number of barbs 574 on each side of the body 572 (see FIG. 5C), the general inventive concepts are not so limited. In some exemplary embodiments, one or more barbs 574 are only on one side of the body 572. In some exemplary embodiments, the number of barbs 574 on one side of the body 572 differs from the number of barbs 574 on the other side of the body 572. While the illustrated embodiment shows the second shaped portion 570 to be symmetrical about the central axis $ca_2$, the general inventive concepts are not so limited. In some exemplary embodiments, the size, shape, and/or positions of the barbs 574 differ on opposite sides of the central axis $ca_2$ of the body 572.

Figure 5A:
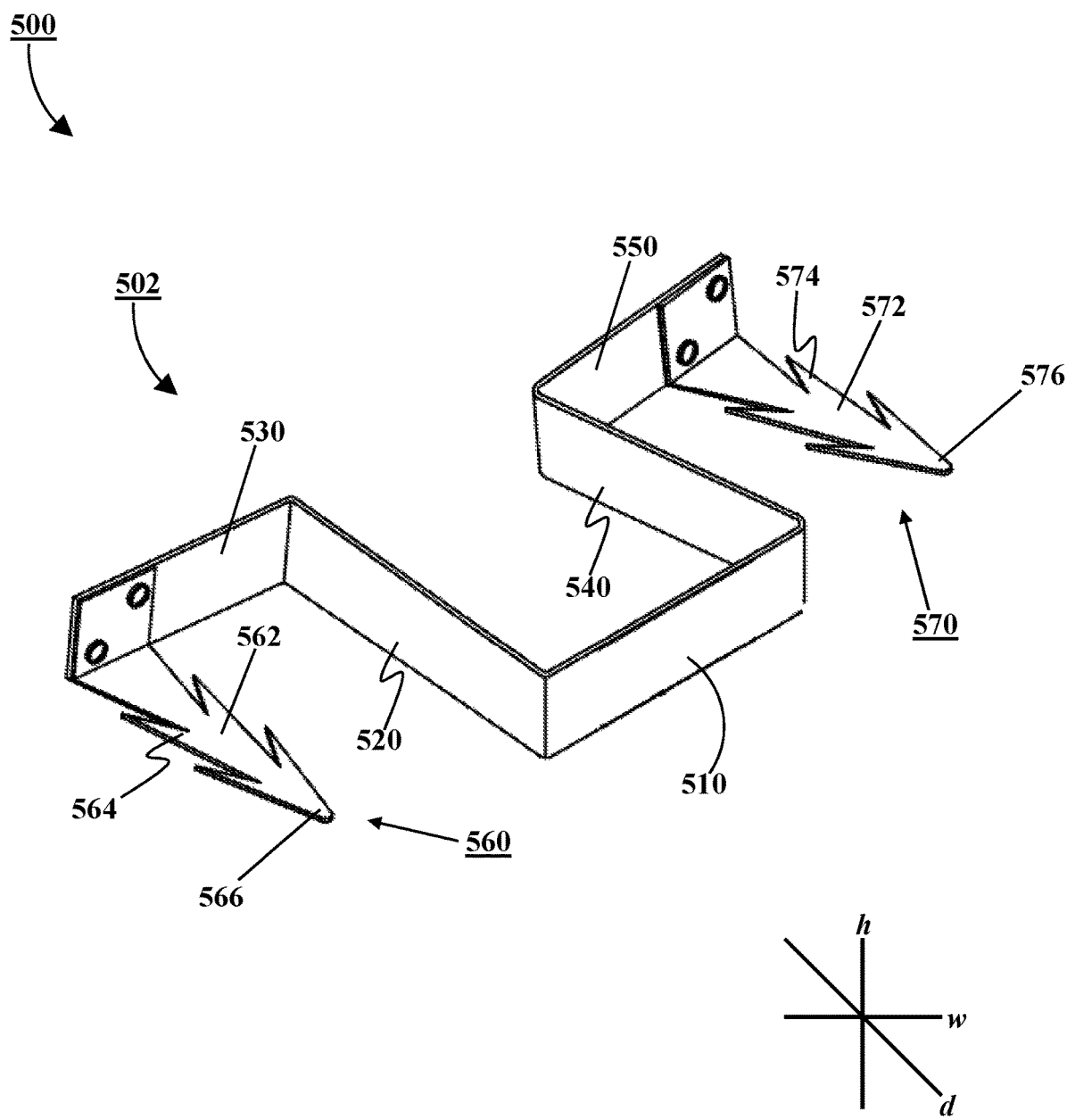
FIGS. 5A-5E illustrate an insulation mounting bracket, according to one exemplary embodiment.
Figure 5B:
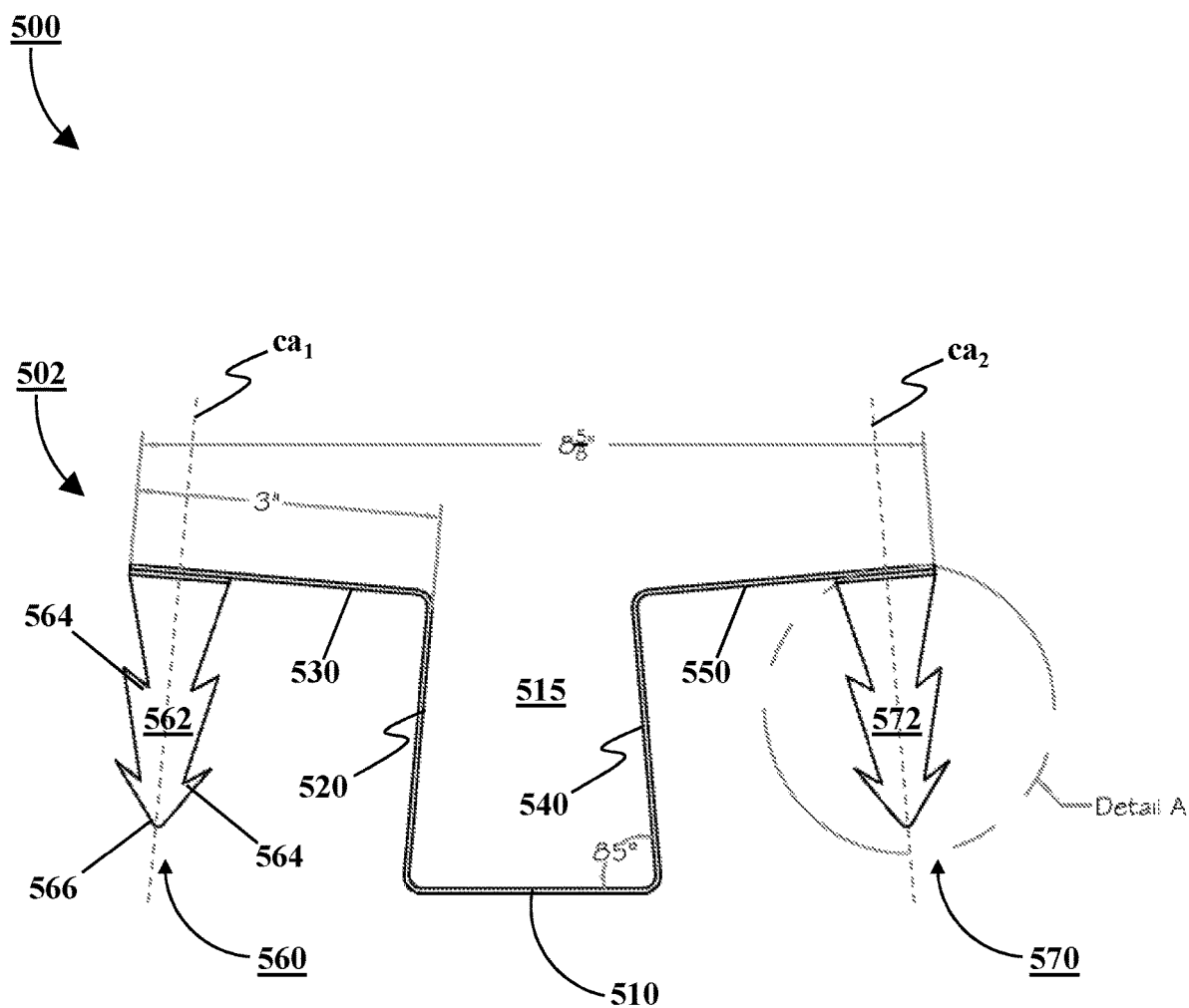
Figure 5C:
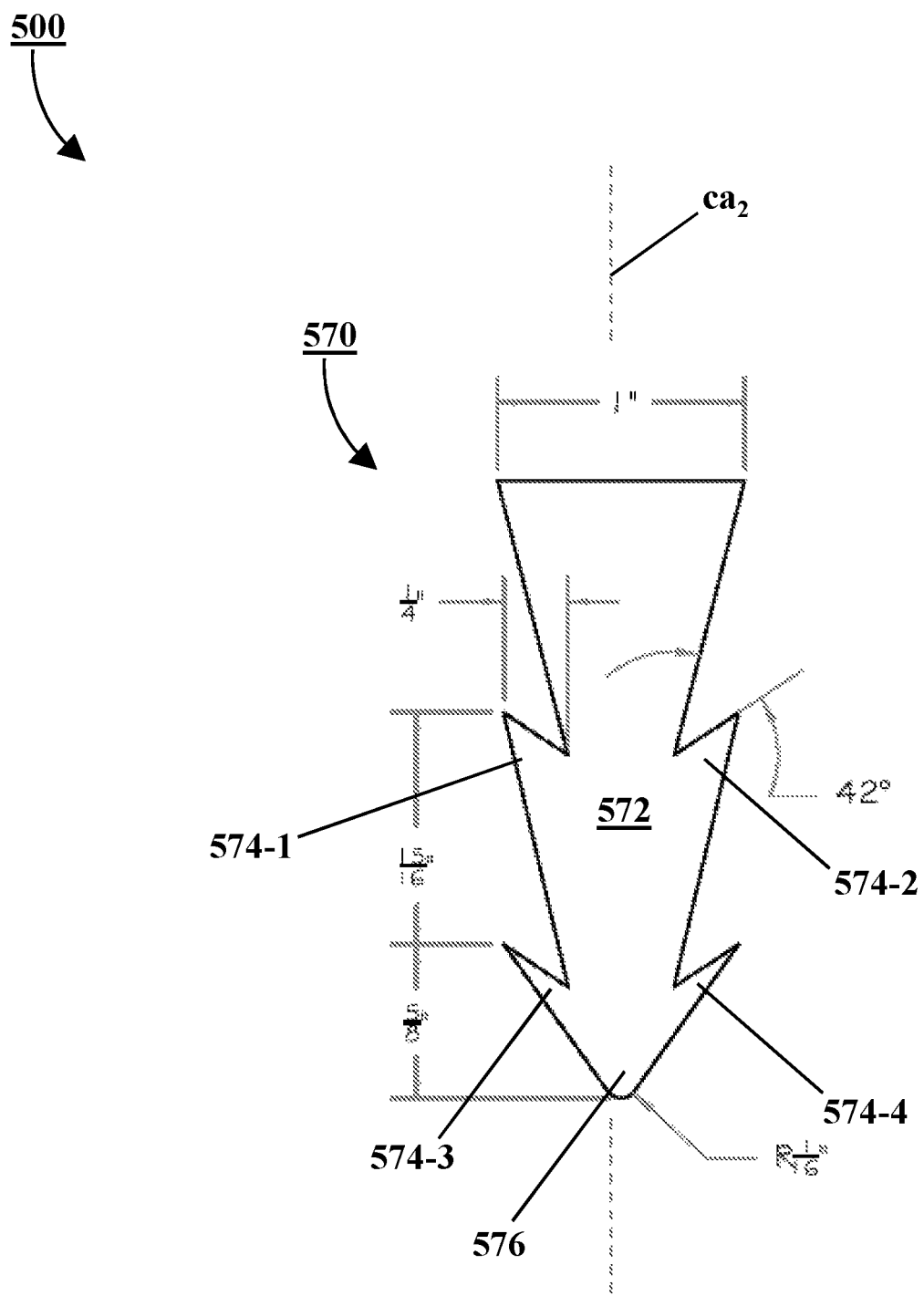
Figure 5D:
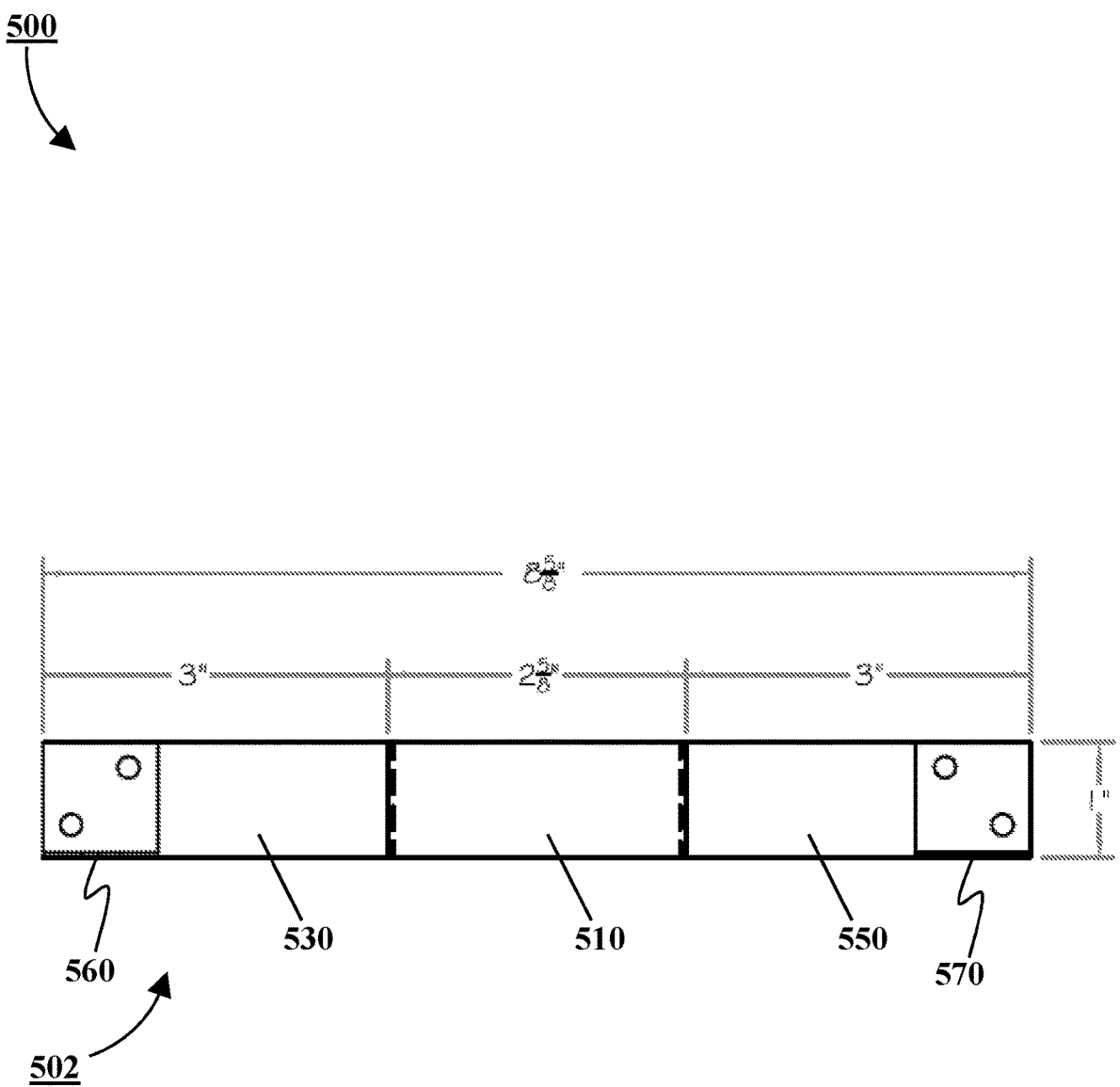
Figure 5E:
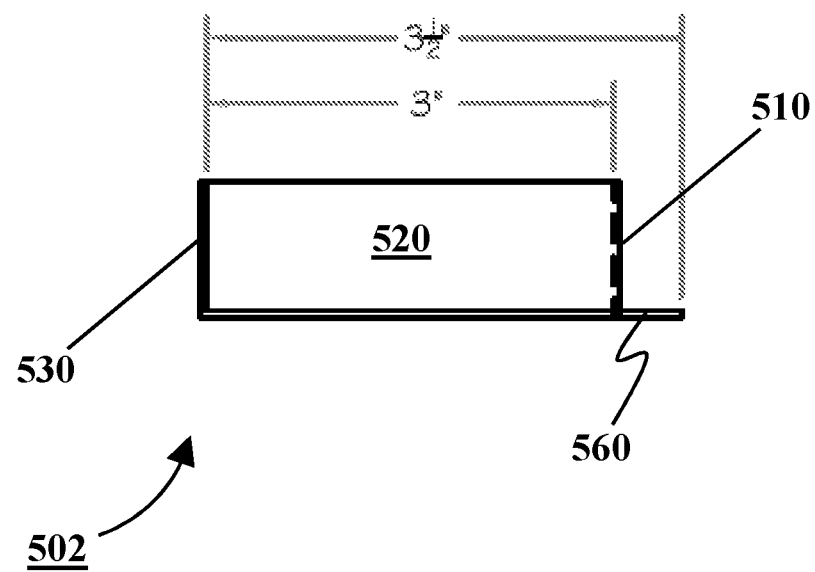

As shown in FIG. 5C, in one specific exemplary embodiment, the body 572 of the second shaped portion 570 includes four distinct barbs, i.e., a first barb 574-1, a second barb 574-2, a third barb 574-3, and a fourth barb 574-4. A size, shape, and angle of the first barb 574-1 and the second barb 574-2 are the same. A size, shape, and angle of the third barb 574-3 and the fourth barb 574-4 are the same. In this exemplary embodiment, at least one of the size, shape, and angle of the first and second barbs 574-1, 574-2 is different from that of the third and fourth barbs 574-3, 574-4. In this exemplary embodiment, the angle of at least the first and second barbs 574-1, 574-2 is 42 degrees. The general inventive concepts contemplate that the barbs can have any angle suitable to hold the insulation once it is impaled on the shaped portion.

Figure 6:
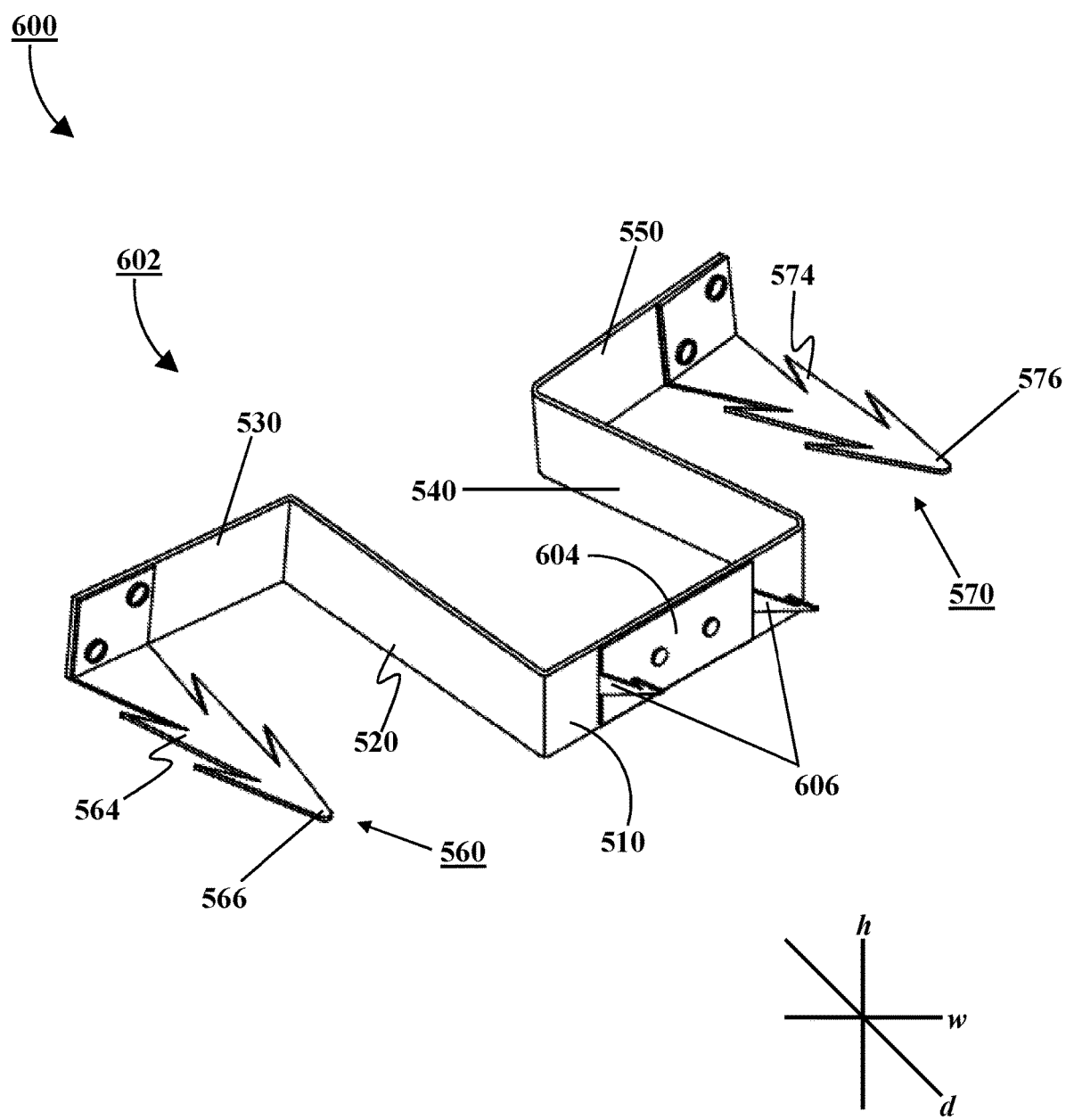
FIG. 6 is a perspective view of an insulation mounting bracket, according to another exemplary embodiment.

A single-piece mounting bracket 600, according to another exemplary embodiment, is shown in FIG. 6. The mounting bracket 600 is similar to the mounting bracket 500 and like reference numbers have been used to show equivalent structure. The mounting bracket 600 includes a bracket body 602 with an integrated mullion cover mount 604 situated on the middle portion 510 of the bracket body 602. The mullion cover mount 604 includes a pair of spaced barbs 606. In some exemplary embodiments, the mullion cover mount 604 is permanently affixed to the middle portion 510 of the bracket body 602. In some exemplary embodiments, the barbs 606 are formed as part of the middle portion 510 of the bracket body 602, with the barbs 606 constituting the mullion cover mount 604.

The barbs 606 are operable to pierce and hold insulation (e.g., the mullion cover 121 or the mullion cover 123) for protecting the mullion 152. Consequently, the mounting bracket 600 does not require separate fasteners (e.g., the spiral screws 402) or a separate mullion cover mount (e.g., the mullion cover hanger 110) to support the mullion cover insulation.

The bracket 600 can be made of any suitable (i.e., heat-resistant) material. In some exemplary embodiments, the bracket 600 is made of a metal including, but not limited to, steel, galvanized steel, brass, and aluminum. Ceramic materials may also be used to form the bracket 600. In certain embodiments, the bracket 600 is formed of galvanized steel, and preferably 20 gauge galvanized steel.

In operation, the mounting bracket 500 or 600 is interfaced with a support structure (e.g., the mullion 152) in proximity to a location where insulation (e.g., the curtain wall insulation 102) is to be installed. More specifically, the mounting bracket 500/600 is friction fit onto the mullion 152, whereby the mullion 152 is received in a cavity 515 defined by the middle portion 510, the first sidewall 520, and the second sidewall 540 of the bracket body 502. The first sidewall 520 and the second sidewall 540 are able to flex outward relative to the middle portion 510, such that the angle θ increases. Typically, given the rectangular/square nature of the mullion 152, the angle θ will be approximately 90 degrees, such that the first sidewall 520 and the second sidewall 540 become substantially parallel to one another when the bracket 500 is in the installed state. The friction fit is suitable to secure the mounting bracket 500/600 to the mullion 152 without the need for any additional fasteners. Furthermore, use of the mounting bracket 500/600 to install the insulation increases the friction fit of the mounting bracket 500/600 on the mullion 152. In other words, the design of the mounting bracket 500/600 causes the weight of the insulation being supported by the mounting bracket 500/600 to exert a complementary force that acts to better "hold" the mounting bracket 500/600 in place relative to the mullion 152, such that the mounting bracket 500/600 resists sliding down or coming off of the mullion 152.

With the mounting bracket 500/600 affixed to the mullion 152, the first shaped portion 560 is situated on one side of the mullion 152 and the second shaped portion 570 is situated on the other side of the mullion 152. Given this configuration, the first shaped portion 560 and the second shaped portion 570 can each penetrate through curtain wall insulation 102 with the barbs 564, 574 on these shaped portions 560, 570 effectively holding the curtain wall insulation 102 in place. The barbs 564, 574 are suitable to secure the curtain wall insulation 102 to the mounting bracket 500/600 without the need for any additional structure (e.g., locking washers). Additionally, in the case of the mounting bracket 600, the mullion cover mount 604 is aligned with and facing away from a front of the mullion 152 when the bracket 600 is installed on the mullion 152. Accordingly, the mullion cover 121, 123 can be pressed onto the mullion cover mount 604 of the bracket 600 and held in place by the parallel barbed members 606.

It will be obvious to one of ordinary skill in the art, that any suitable number of the mounting brackets 500/600 can be used to secure the insulation (e.g., the curtain wall insulation 102, the mullion cover 121, 123) in the desired spaces.

Because the mounting brackets 500, 600 operate to effectively install and affix the insulation without the need for separate fasteners, locking washers, and the like, the mounting brackets 500, 600 allow for a simpler and quicker installation of fire perimeter insulation. Furthermore, because fewer of the mounting brackets 500, 600 will typically be needed to effectively install and affix the insulation, the mounting brackets 500, 600 allow for a simpler and quicker installation of fire perimeter insulation.

The scope of the general inventive concepts presented herein are not intended to be limited to the particular exemplary embodiments shown and described herein. From the disclosure given, those skilled in the art will not only understand the general inventive concepts and their attendant advantages, but will also find apparent various changes and modifications to the devices and systems disclosed. For example, while the exemplary embodiments described and shown herein relate to fire perimeter insulation, the inventive mounting brackets could be used to install other forms of insulation in building cavities. It is sought, therefore, to cover all such changes and modifications as fall within the spirit and scope of the general inventive concepts, as described and/or claimed herein, and any equivalents thereof.

What is claimed is:

1. A mounting bracket comprising a bracket body having a middle portion, a first sidewall, a first leg, a first shaped portion, a second sidewall, a second leg, and a second shaped portion, wherein the middle portion extends between and connects the first sidewall and the second sidewall; wherein the first leg extends from the first sidewall; wherein the first shaped portion extends from the first leg; wherein the second leg extends from the second sidewall; wherein the second shaped portion extends from the second leg; and wherein the bracket body further includes a mullion cover mount having a pair of spaced barbs.

2. The mounting bracket of claim 1, wherein the middle portion forms an angle θ with each of the first sidewall and the second sidewall; and wherein the angle θ is less than 90 degrees.

3. The mounting bracket of claim 2, wherein the angle θ is greater than 70 degrees.

4. The mounting bracket of claim 1, wherein the first leg is perpendicular to the first sidewall, and wherein the second leg is perpendicular to the second sidewall.

5. The mounting bracket of claim 1, wherein a height of the first leg is equal to a height of the first sidewall, and wherein a height of the second leg is equal to a height of the second sidewall.

6. The mounting bracket of claim 1, wherein a depth of the first leg is equal to a width of the first sidewall, and wherein a depth of the second leg is equal to a width of the second sidewall.

7. The mounting bracket of claim 1, wherein the first shaped portion and the second shaped portion each include a body having one or more barbs and a tapered end.

8. The mounting bracket of claim 7, wherein the body of the first shaped portion includes a plurality of the barbs, and wherein the body of the second shaped portion includes a plurality of the barbs.

9. The mounting bracket of claim 8, wherein a number of the barbs on one side of the body of the first shaped portion differs from a number of the barbs on the opposite side of the body of the first shaped portion, and wherein a number of the barbs on one side of the body of the second shaped portion differs from a number of the barbs on the opposite side of the body of the second shaped portion.

10. The mounting bracket of claim 7, wherein the first shaped portion is symmetrical about a central axis of the body of the first shaped portion, and wherein the second shaped portion is symmetrical about a central axis of the body of the second shaped portion.

11. The mounting bracket of claim 10, wherein the central axis of the body of the first shaped portion is perpendicular to the first leg, and wherein the central axis of the body of the second shaped portion is perpendicular to the second leg.

12. The mounting bracket of claim 1, wherein the first shaped portion extends from an end of the first leg furthest from the first sidewall, and wherein the second shaped portion extends from an end of the second leg furthest from the second sidewall.

13. The mounting bracket of claim 1, wherein a depth of the first shaped portion is greater than a depth of the first leg, and wherein a depth of the second shaped portion is greater than a depth of the second leg.

14. The mounting bracket of claim 1, wherein a depth of the first shaped portion is less than a depth of the first sidewall, and a depth of the second shaped portion is less than a depth of the second sidewall.

15. The mounting bracket of claim 1, wherein a depth of the first shaped portion is greater than a depth of the first sidewall, and wherein a depth of the second shaped portion is greater than a depth of the second sidewall.

16. The mounting bracket of claim 1, wherein the bracket body is a unitary structure.

17. The mounting bracket of claim 1, wherein the bracket body is made of a metal or a metal alloy.

18. The mounting bracket of claim 1, wherein the bracket body includes a mounting cavity defined by the middle portion, the first sidewall, and the second sidewall; and wherein the mounting cavity is sized to be friction fit onto a mounting structure.

19. A curtain wall insulation installation system comprising a plurality of mounting brackets according to claim 1.

* * * * *